April 4, 1961  J. B. COX  2,978,015
SAFETY BELT ASSEMBLY
Filed Feb. 16, 1959

Jack B. Cox
INVENTOR.

BY Clarence A. O'Brien
and Harvey B. Jacobson
Attorneys

United States Patent Office 2,978,015
Patented Apr. 4, 1961

2,978,015
SAFETY BELT ASSEMBLY
Jack B. Cox, Box 4, Linwood, N.C.
Filed Feb. 16, 1959, Ser. No. 793,524
1 Claim. (Cl. 155—189)

The present invention generally relates to a safety belt assembly and more particularly to an attachment for an automotive vehicle in the form of a belt worn by a child together with means engaged with the back rest of a seat assembly normally provided in automotive vehicles.

One of the most prevalent causes of injuries due to accidents and near accidents when the automotive vehicle comes to a sudden stop is occupants of the vehicle being thrown forwardly against the relatively hard dashboard or similar areas of the vehicle. This is especially true with children and while some safety devices have been provided for adults, there is very little available in the way of preventing such injuries to children who normally ride in a standing position on the front seat and are unaware of dangers caused by sudden stopping. It is well known that small children will stand on the seat portion of the seat assembly and normally have a very insecure grip on the seat assembly and thus are susceptible to being thrown against the dashboard of a vehicle upon sudden deceleration which may be caused by sudden application of the brakes or collision with another object such as a vehcile. Therefore, it is the primary object of the present invention to provide an attachment for a split seat which provides an anchor for a child equipped with a safety belt.

Another object of the present invention is to provide an attachment for the split type front seat employed in automotive vehicles which includes means for attachment to a belt encircling the child for preventing the child from falling forwardly as long as one of the split seat backs are retained generally in a vertical position.

A further important feature of the present invention is to provide a safety belt which is simple in construction, easy to install, requires no modification of existing vehicle structure and is generally inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
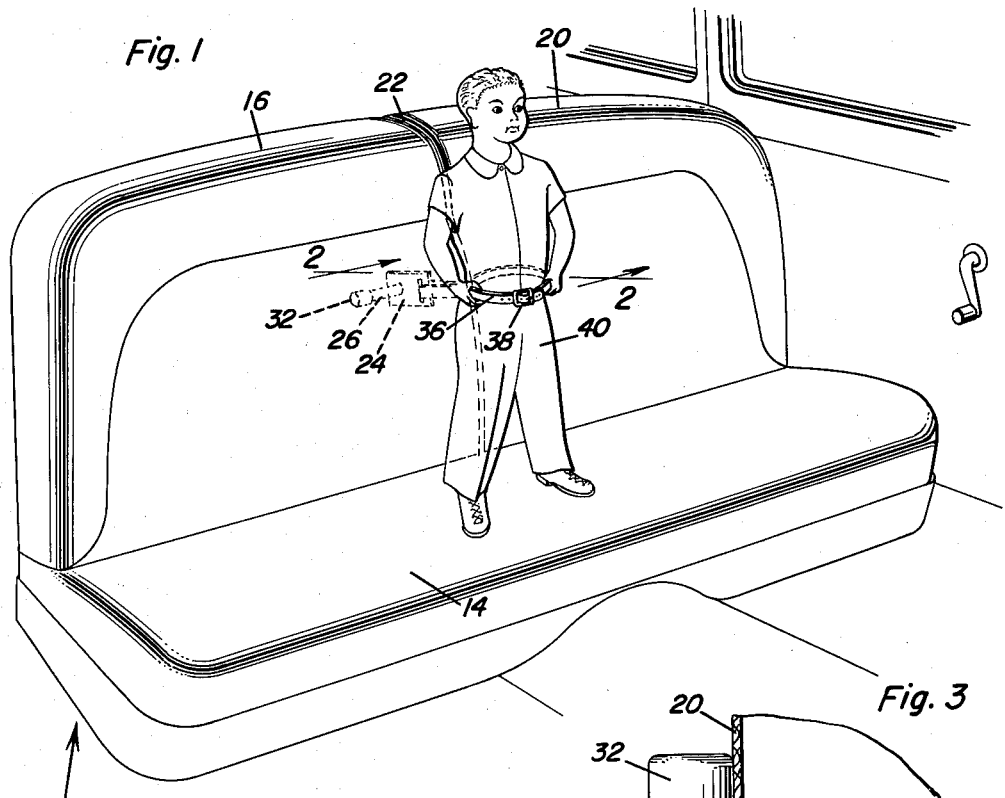
Figure 1 is a perspective view of the safety belt assembly of the present invention installed on a vehicle and employed for holding a child in a safe manner.

Referring now particularly to the drawings, the numeral 10 generally designates the safety belt assembly of the present invention which is constructed for use with a front seat assembly generally designated by the numeral 12 which includes a seat portion 14 and a pair of split back rests 16 and 20 which have a vertical slit or opening 22 adjacent the abutting edges thereof.

The seat belt of the present invention includes a metal plate 24 disposed in the opening 22 and having a transverse tubular pipe 26 extending through an opening 28 therein and secured in the opening as by welding 30. The pipe 26 is sufficiently long to bridge the opening 22 and engage the rear surfaces of the adjacent back rests 16 and 20 with the ends of the tubular pipe 26 being provided with cup shaped protectors or caps 32 constructed of resilient material such as rubber or plastic.

Figure 3:
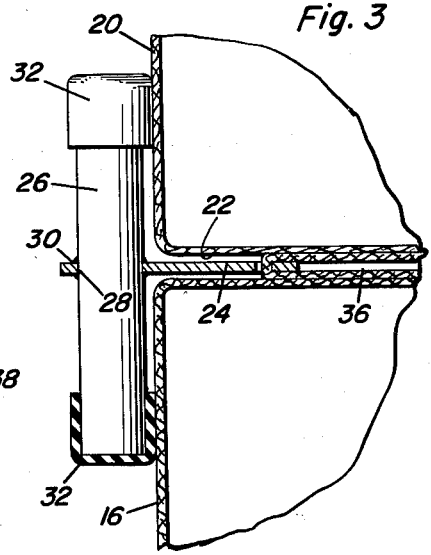
Figure 3 is a detail plan sectional view taken substantially upon a plane passing along section line 3—3 of Figure 2 illustrating further structural details of the safety belt assembly.
Figure 2:
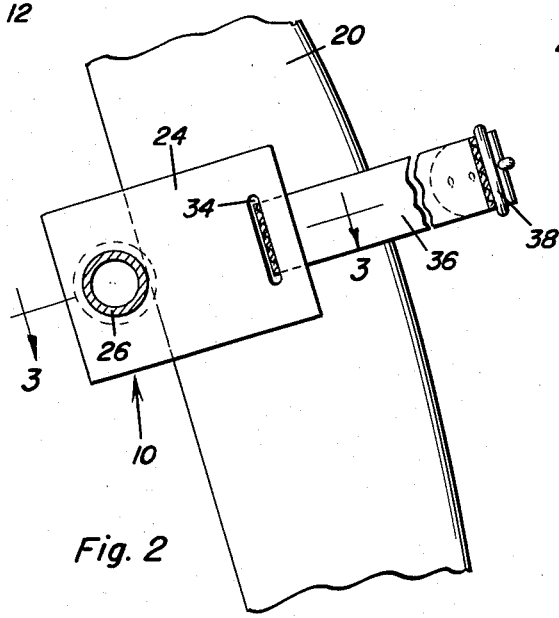
Figure 2 is a vertical sectional view taken substantially upon a plane passing along section line 2—2 of Figure 1 illustrating the relationship of the attachment and anchored to the seats.

The front or forward edge of the plate 24 is disposed intermediate the forward and rear surfaces of the back rests 16 and 20 thus preventing contact between the plate and the occupant of the seat. The forward edge portion of the plate 24 is provided with a vertical slot 34 in spaced parallel relation to the forward edge which receives the central portion of an elongated belt 36. Figure 3 illustrates the frictional engagement between the belt 36 and adjacent surfaces of the back rests thus holding the belt and plate in vertically adjusted position. The belt 36 is provided with a buckle 38 joining the free ends thereof together which buckle is disposed forwardly of a small child 40 standing on the seat portion 14 of the seat assembly 12 whereby the belt 36 will retain the child in the position generally illustrated in Figure 1.

In operation, the plate 24 is inserted into the opening 22 with the transverse pipe 26 in engagement with the rear surfaces of the back rests and the strap or belt 36 would be used as a safety belt for children. This device does not require the modification of the conventional vehicle in any way whatsoever and may be easily installed on the vehicle and easily removed therefrom with there being no residual brackets or any other material that is normally used solely for this type of safety belt. The rocking or rolling engagement of the caps on the pipe 26 engaging the rear surface of the back rests provides a measure of vertical adjustment for orientation of the belt in the optimum condition depending upon the height of the child and other factors.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A safety belt assembly for an occupant of a vehicle seat having a bottom and a split back rest for holding the occupant adjacent the front surface of the back rest upon rapid deceleration of the vehicle during forward travel thereof, said safety belt assembly comprising a rigid vertically disposed rectangular plate adapted to be movably disposed between the sections of the back rest, the forward edge of said plate being disposed rearwardly of the front surface of the back rest to prevent the occupant of the seat from contacting the forward edge of the plate, a transverse member mounted on said plate adjacent the rear edge thereof, said transverse member bridging the space between the sections of the back rest with the outer ends thereof adapted to rest against the rear surface of the sections of the back rest to prevent forward movement of the plate and permitting vertical shifting movement of the plate and transverse member, the forward portion of said plate having a vertically disposed slot paralleling and spaced from the forward edge thereof, and a flexible belt adapted to extend around the waist of an occupant, said belt extending through said slot for connecting the belt to said plate, the tendency of the flexible belt to return to straight line condition and the thickness thereof combining to frictionally engage the inner side edges of the sections of the back rest thereby frictionally retaining the plate in vertically adjusted position between the sections of the back rest.

References Cited in the file of this patent

UNITED STATES PATENTS

| | | |
|---|---|---|
| 2,288,692 | Fearson | July 7, 1942 |
| 2,670,967 | Kean | Mar. 2, 1954 |
| 2,833,343 | Benson | May 6, 1958 |